(12) United States Patent (10) Patent No.: US 12,676,807 B2
Ashlock et al. (45) Date of Patent: Jul. 7, 2026

(54) INTELLIGENT NETWORK PATH PROBING

(71) Applicant: Cisco Technology, Inc., San Jose, CA (US)

(72) Inventors: Hans Ashlock, Berkeley, CA (US); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/215,440

(22) Filed: Jun. 28, 2023

(65) Prior Publication Data

US 2025/0007810 A1    Jan. 2, 2025

(51) Int. Cl.
 H04L 43/12      (2022.01)
 H04L 43/067     (2022.01)
 H04L 43/10      (2022.01)
(52) U.S. Cl.
 CPC ............ H04L 43/12 (2013.01); H04L 43/067 (2013.01)
(58) Field of Classification Search
 CPC ........ H04L 43/12; H04L 43/067; H04L 43/10
 See application file for complete search history.

(56) References Cited

U.S. PATENT DOCUMENTS

| | | | |
|---|---|---|---|
| 7,852,778 B1 * | 12/2010 | Kompella | ........... H04L 43/0811 |
| | | | 370/242 |
| 10,305,769 B2 | 5/2019 | Allan et al. | |
| 11,528,218 B2 | 12/2022 | Kolar et al. | |
| 11,588,703 B2 | 2/2023 | Barnes | |
| 11,665,092 B2 | 5/2023 | Xiao et al. | |
| 2020/0296023 A1 * | 9/2020 | Kumar | .................. H04L 43/103 |
| 2022/0015006 A1 * | 1/2022 | Di Marco | ........... H04W 40/246 |
| 2022/0224623 A1 | 7/2022 | Kamath et al. | |
| 2022/0224780 A1 * | 7/2022 | Chhabra | ................. H04L 69/18 |
| 2022/0407800 A1 | 12/2022 | Chadha | |

* cited by examiner

*Primary Examiner* — Kamal M Hossain
(74) *Attorney, Agent, or Firm* — Lee & Hayes, P.C.

(57) ABSTRACT

According to one or more embodiments of the disclosure, a device identifies a configuration change in a network based on path probing data obtained by a path probing service from the network. The device causes, based on the configuration change, the path probing service to obtain updated path probing data from the network by sending synthetic probes along a path in the network using a plurality of different protocols. The device selects, based on the updated path probing data, a particular protocol from among the plurality of different protocols to use to probe the path. The device configures the path probing service to probe the path using the particular protocol.

18 Claims, 9 Drawing Sheets

INTELLIGENT NETWORK PATH PROBING

TECHNICAL FIELD

The present disclosure relates generally to computer networks, and, more particularly, to intelligent network path probing.

BACKGROUND

In today's interconnected world, telecommunications companies (telcos), service providers, and enterprises heavily rely on IP/Internet-based networks to meet critical business needs. It is imperative for these entities to understand the paths traversed by their network traffic and the performance of those paths. This understanding allows them to optimize network performance, ensure reliable connectivity, and provide enhanced services to their customers.

Traditionally, obtaining accurate network path performance data that identifies specific IP hops (routers) and evaluating their impact on end-to-end performance has been a complex challenge. However, synthetic network probing techniques have emerged as highly effective tools for addressing this challenge. Notably, tools have emerged which have demonstrated their capabilities in generating network traffic with traffic characteristics identical to those of the applications and services being measured.

However, attempting to trace the complete network path with probes closely mimicking the packet characteristics of the corresponding application is wrought with challenges often leading to failed traces and incomplete network insights. Specifically, given the diversity of packet types employed by different applications and the influence of network heterogeneity and changing network conditions, a comprehensive picture of the network path is frequently unattainable through this approach.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
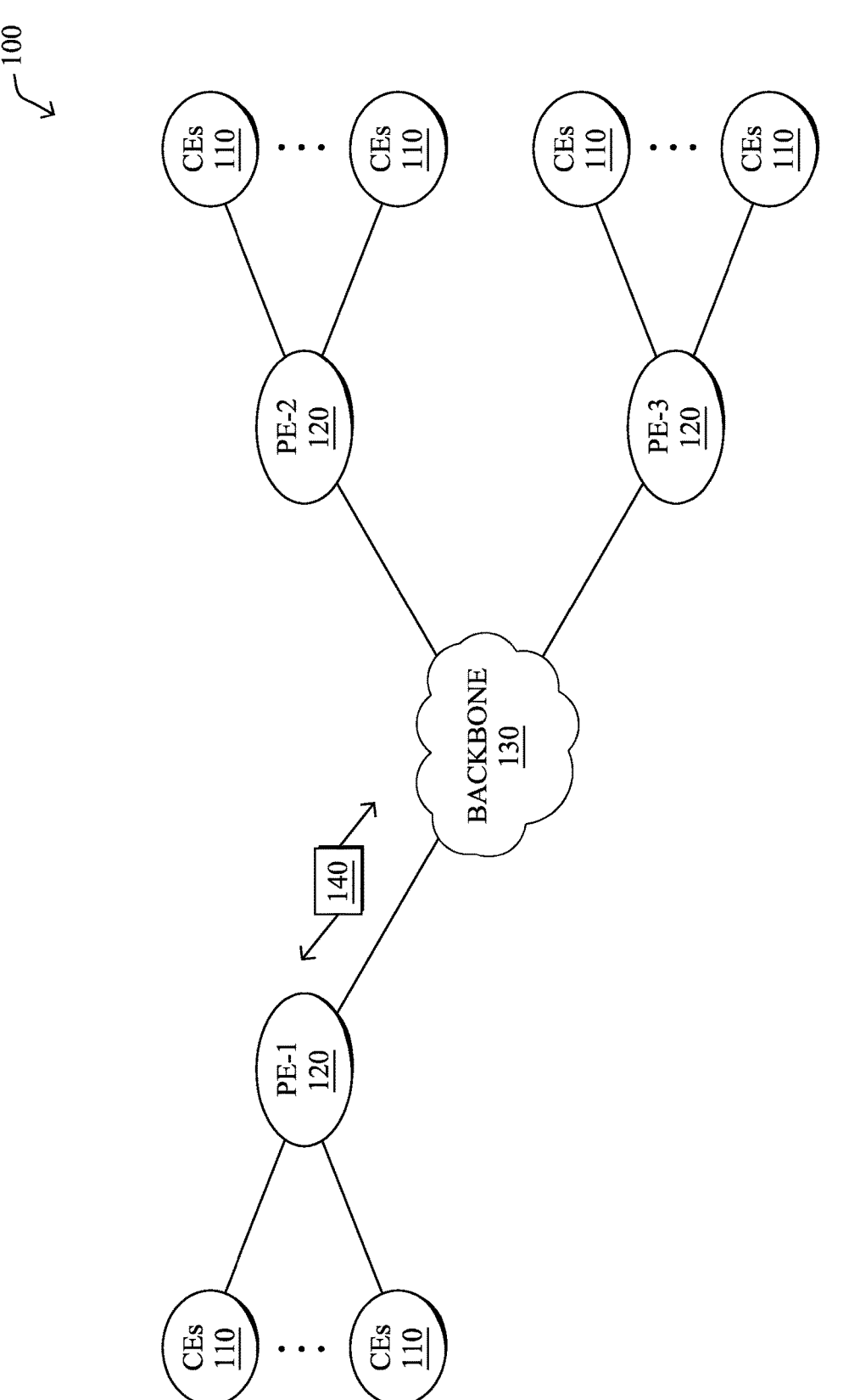
FIGS. 1A-1B illustrate an example communication network.

According to one or more embodiments of the disclosure, a device identifies a configuration change in a network based on path probing data obtained by a path probing service from the network. The device causes, based on the configuration change, the path probing service to obtain updated path probing data from the network by sending synthetic probes along a path in the network using a plurality of different protocols. The device selects, based on the updated path probing data, a particular protocol from among the plurality of different protocols to use to probe the path. The device configures the path probing service to probe the path using the particular protocol.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
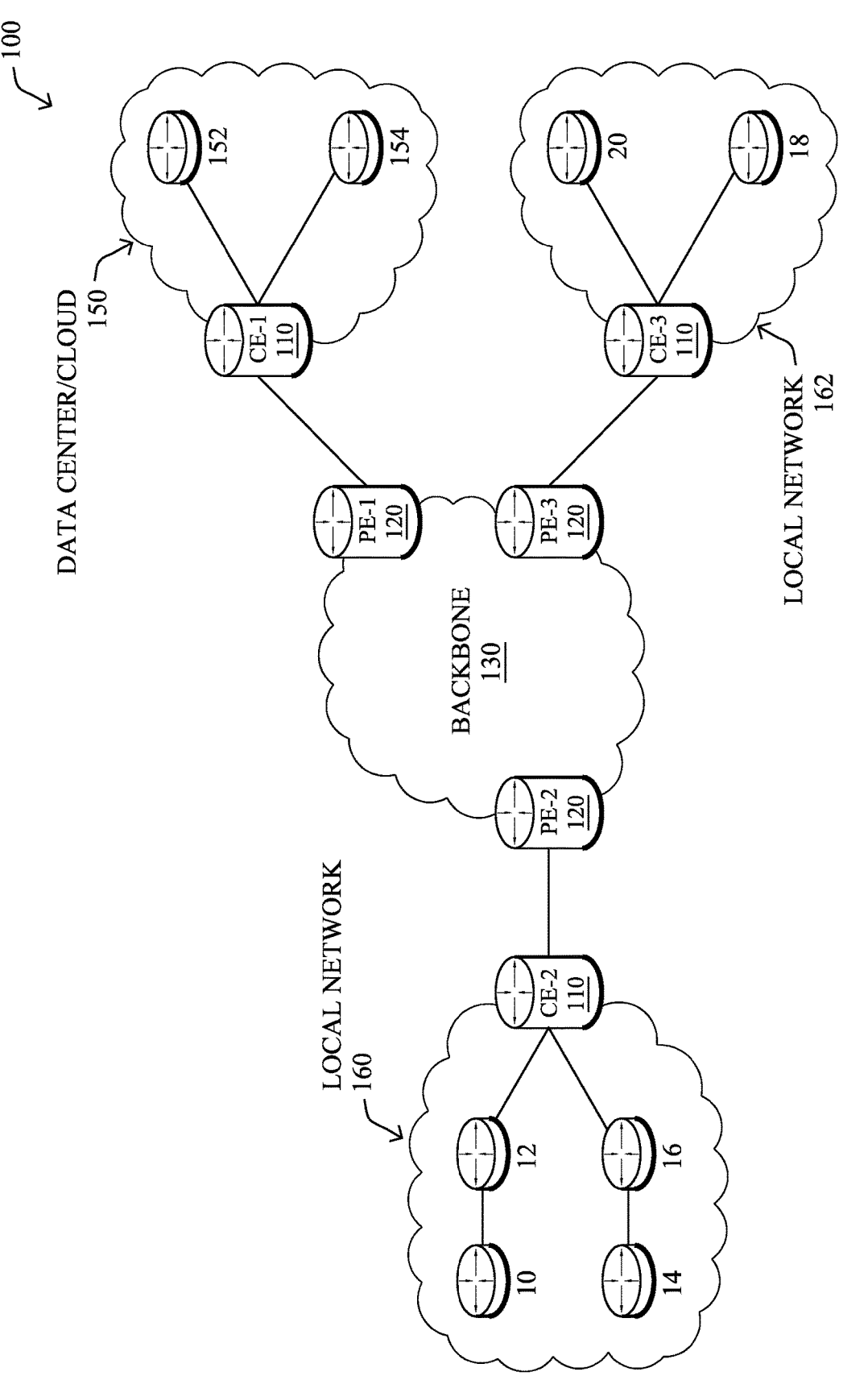

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
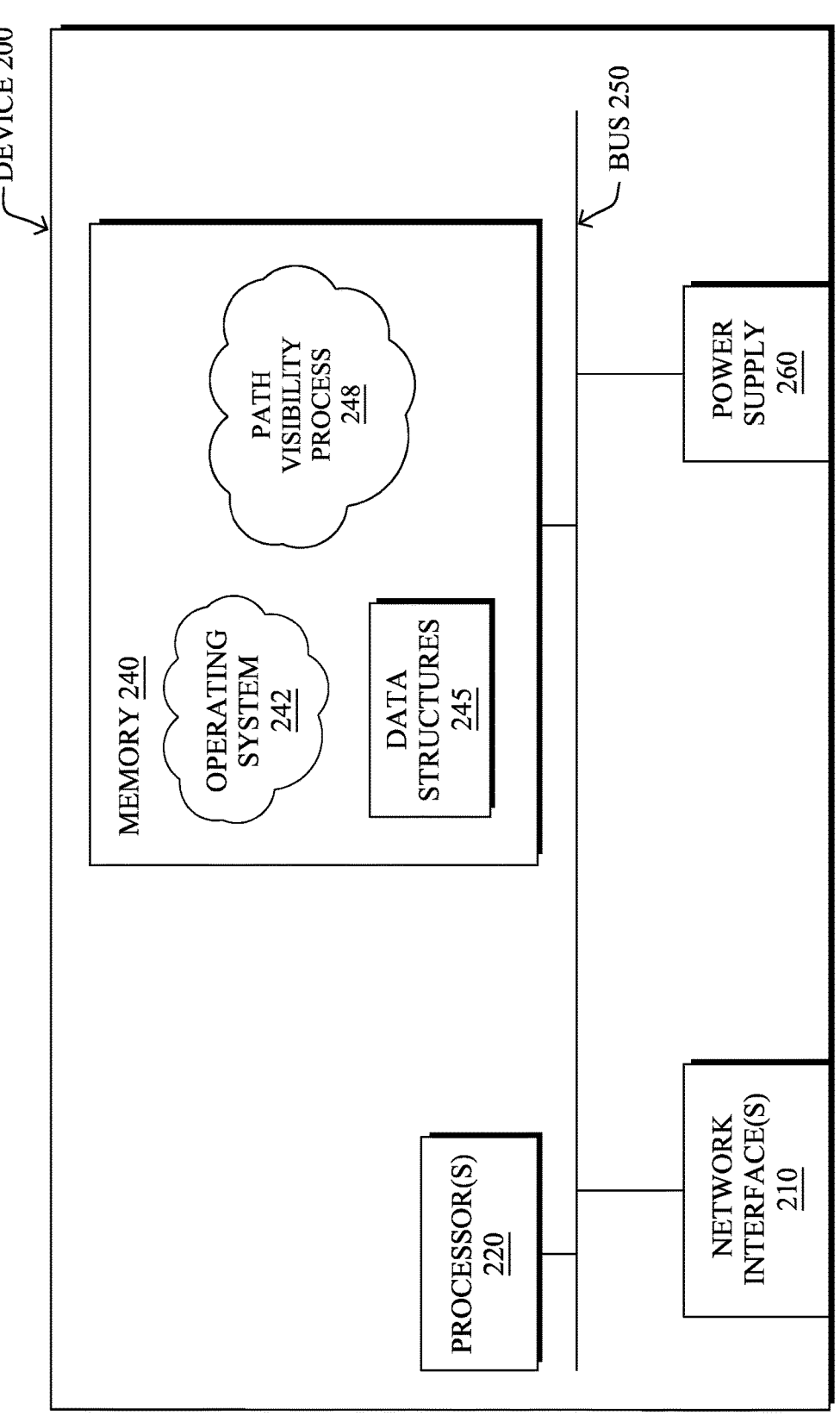
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242

(e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a path visibility process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, path visibility process 248 may include computer executable instructions executed by the processor 220 to establishing network path visibility using an intelligent network path probing technique and/or to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, path visibility process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, path visibility process 248 may include computer executable instructions that, when executed by processor(s) 220, cause device 200 to perform the techniques described herein. To do so, in some embodiments, path visibility process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, path visibility process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the path visibility process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
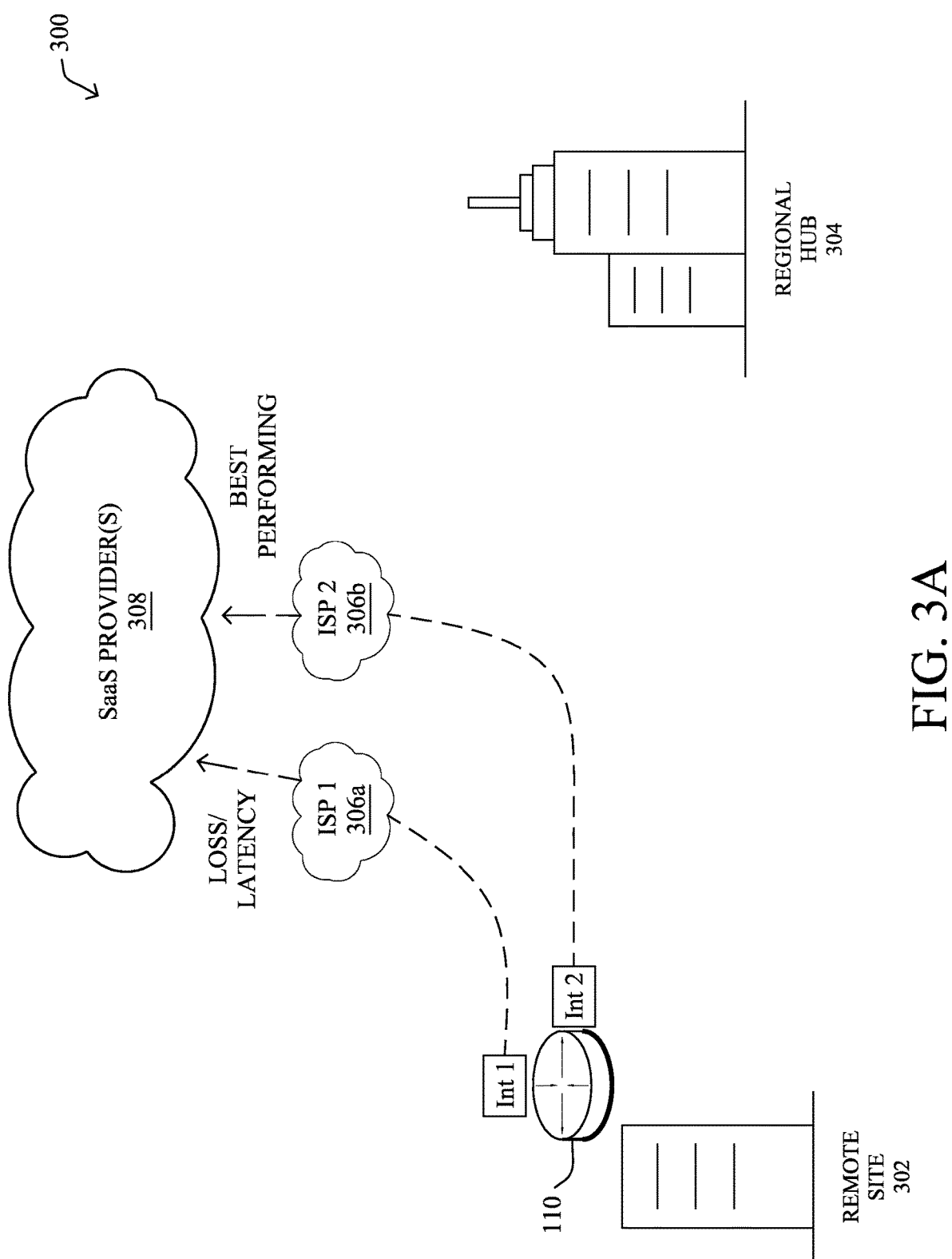
FIGS. 3A-3B illustrate example network deployments.
Figure 3B:

FIGS. 3A-3B illustrate examples of network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

As noted above, service providers, and enterprises that operate or depend on IP/Internet based networks for critical business need to understand both the paths that their network traffic takes and the performance of those paths. Ideally, network path performance data should identify as many specific IP hops (routers) as possible in the path, and the performance impact of each of those hops/segments on the overall end-to-end performance of a given network connection.

Generally, synthetic network probing techniques are utilized to identify network paths. These techniques generate network traffic from a source to a destination using the same traffic characteristics as the application/services whose performance is sought to be understood. In addition, traceroute-style algorithms may be used to achieve these insights by leveraging the IP packet time to live (TTL) header and TTL Expired Internet Control Message Protocol (ICMP) responses from routers to build hop-by-hop representations of the paths taken by those same synthetic probe packets. In this way, the measured performance of these synthetic packets and the network paths is often assumed to be an accurate approximation of the actual performance and path of the corresponding applications/services.

However, while it may be attractive to use packet characteristics for the path tracing that most closely represent the type of packets used by the corresponding applications being measured, it is often impossible to get a complete picture of the network path using a single approach. For example, various factors can impact the effectiveness of probing. For instance, routers may have a different response characteristic depending on the type of packets used for probing (e.g., ICMP vs TCP), the protocol that yields the most complete path trace may not match the protocol used by the application being measured (e.g., ICMP is used for probing but application being measured is HTTP/TCP based), ACL, NAT, and firewall rules may impact probing, different protocols and packet options, such as Differentiated Services Code Point (DSCP) options, may be treated with different processing priority and or forwarding by routers, etc. In addition, there are often "processing" delays in path trace performance data, which may arise due to the time it may take a router CPU to process and construct an ICMP TTL Expired response. These additional delays have no bearing on actual network performance, and need to be eliminated if an accurate measure of a specific network path's performance is to be achieved.

Therefore, very often, the synthetic network configuration that most closely approximates that of the traffic generated by the applications of concern is not the same as the configuration that will yield the most complete hop-by-hop view of the network. Furthermore, often different portions of a network will respond better to different probing methods. As a result, attempting to trace the complete network path using the synthetic network configuration that most closely approximates that of the traffic generated by the applications of concern often leads to failed and/or incomplete traces which translates to an incorrect understanding of the paths that network traffic takes and the performance of those paths. Consequently, application performance is not able to be accurately understood and/or optimized using such incomplete and/or incorrect information.

Intelligent Network Path Probing

The techniques herein introduce mechanisms for smart network probing that can start with a network probing characterization to determine a set of potential probing algorithms that should be used with a given path between a source and destination. The mechanisms may leverage learning from these characterizations to make future recommendations for more accurate probing methods based on various network characteristics, as well as intelligently detecting when network policies may have changed that may impact path visibility, triggering another "probing scan". These intelligent network probing techniques provide a way for organizations to obtain a highly accurate visibility of the network paths traversed by their critical application traffic.

Illustratively, the techniques described herein may be performed by hardware, software, and/or firmware, such as in accordance with the path visibility process 248, which may include computer executable instructions executed by the processor 220 (or independent processor of interfaces 210) to perform functions relating to the techniques described herein.

Specifically, according to one or more embodiments of the disclosure as described in detail below, a device identifies a configuration change in a network based on path probing data obtained by a path probing service from the network. The device causes, based on the configuration change, the path probing service to obtain updated path probing data from the network by sending synthetic probes along a path in the network using a plurality of different protocols. The device selects, based on the updated path probing data, a particular protocol from among the plurality of different protocols to use to probe the path. The device configures the path probing service to probe the path using the particular protocol.

Figure 4:
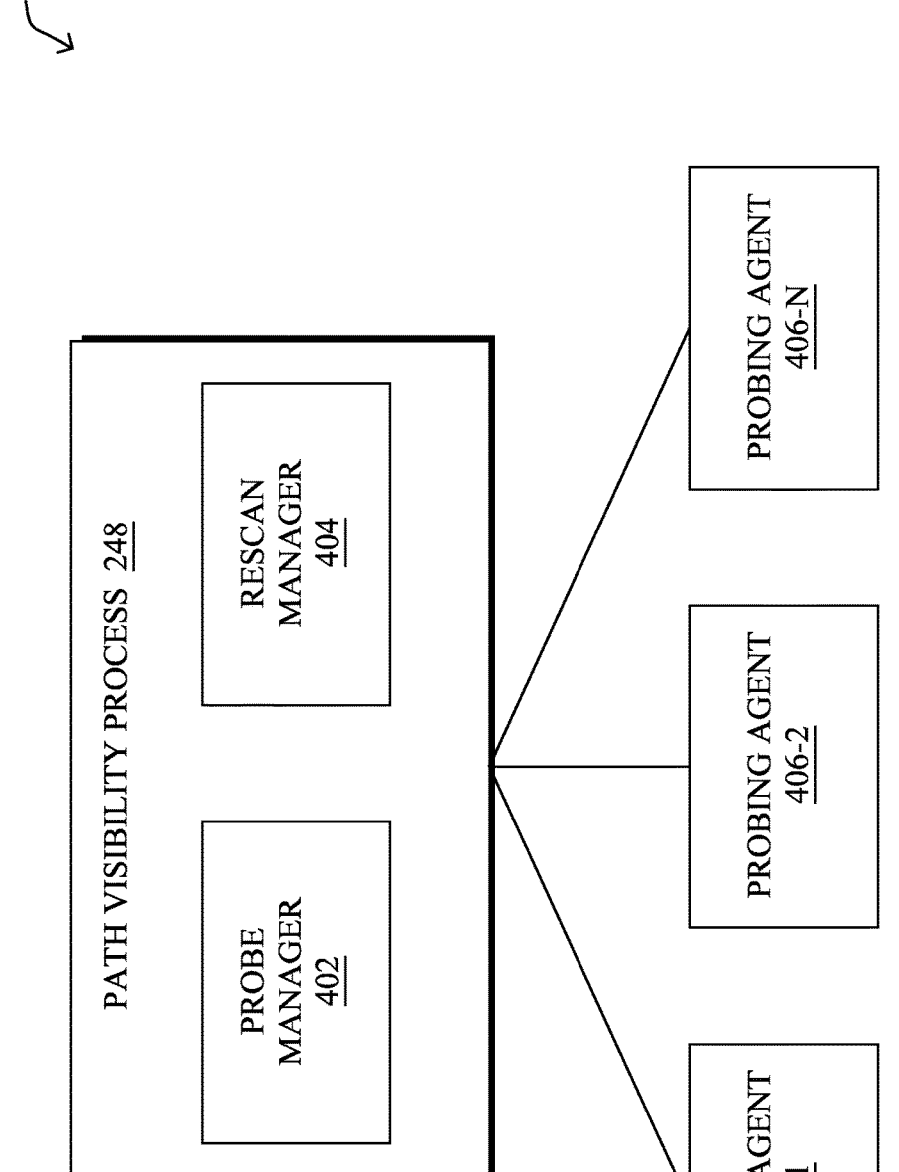
FIG. 4 illustrates an example of an architecture of a synthetic probing system for intelligent network path probing.
Figures 5A, 5B:
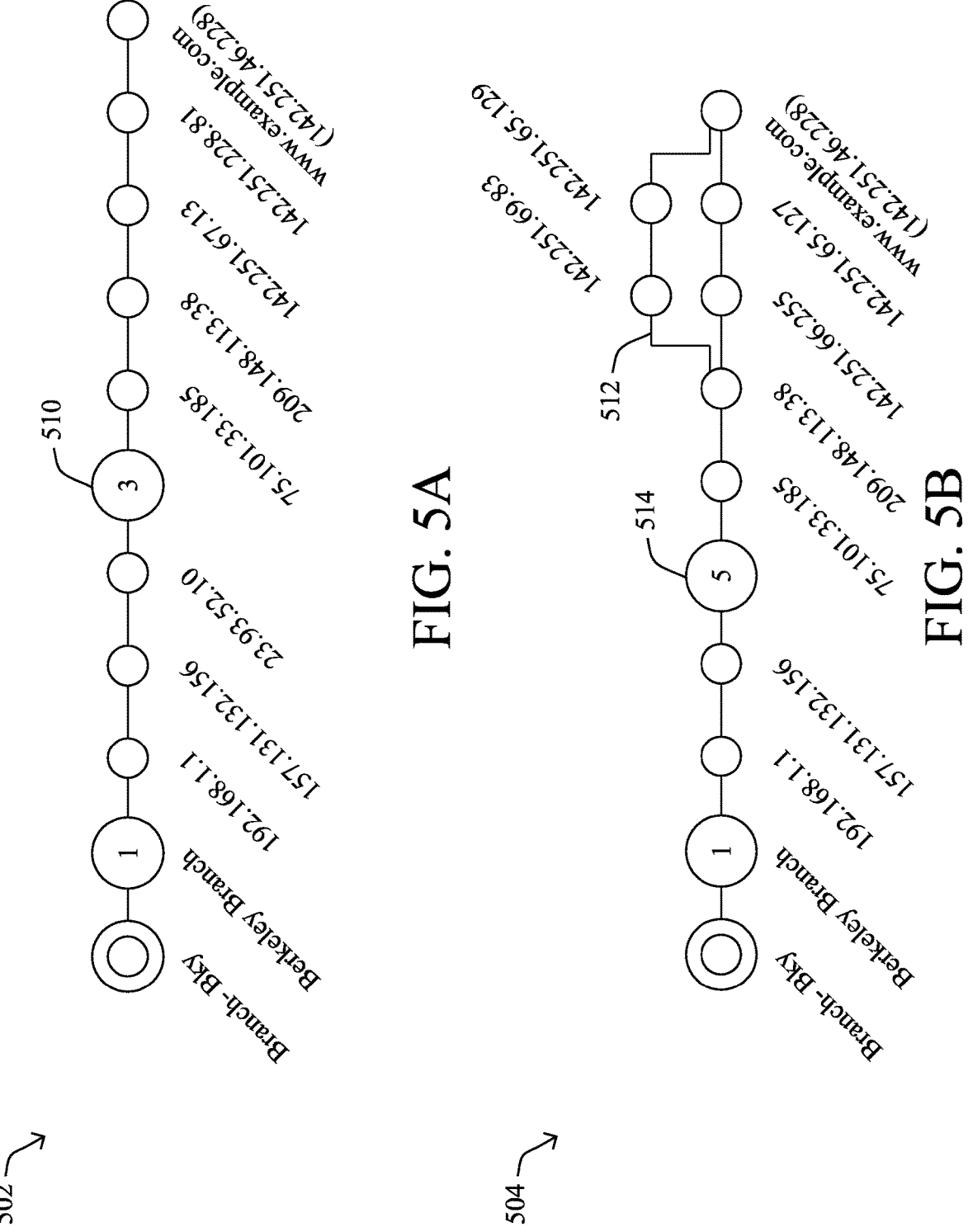
FIGS. 5A-5D illustrate examples of path traces associated with intelligent network path probing.
Figure 5C:
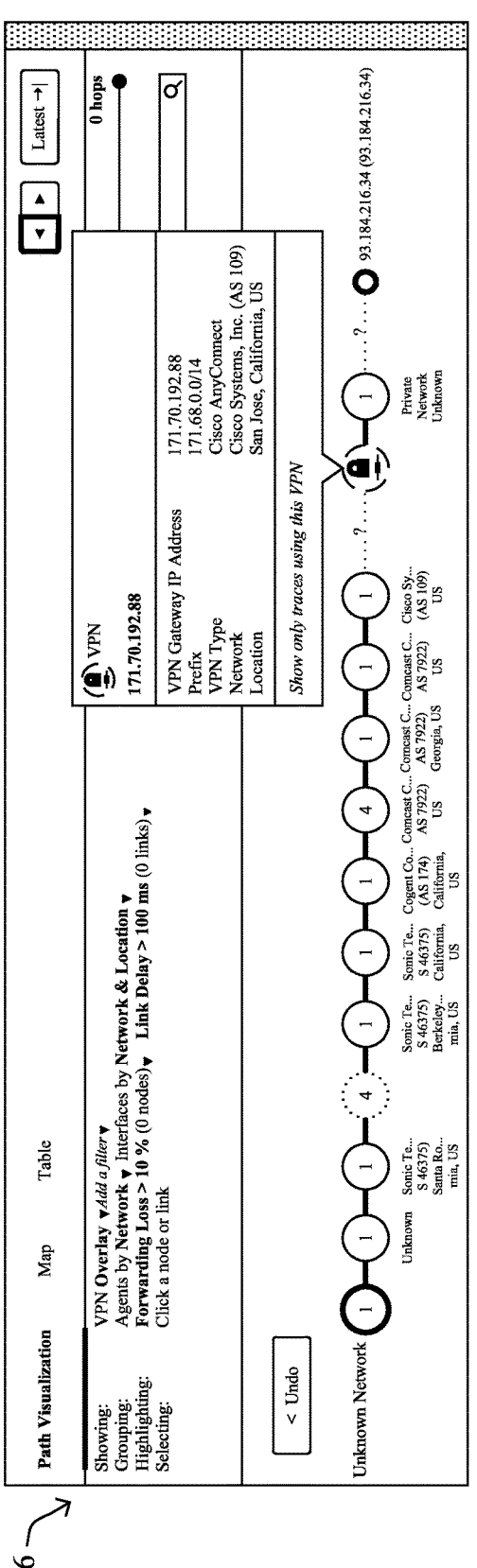
Figure 5D:
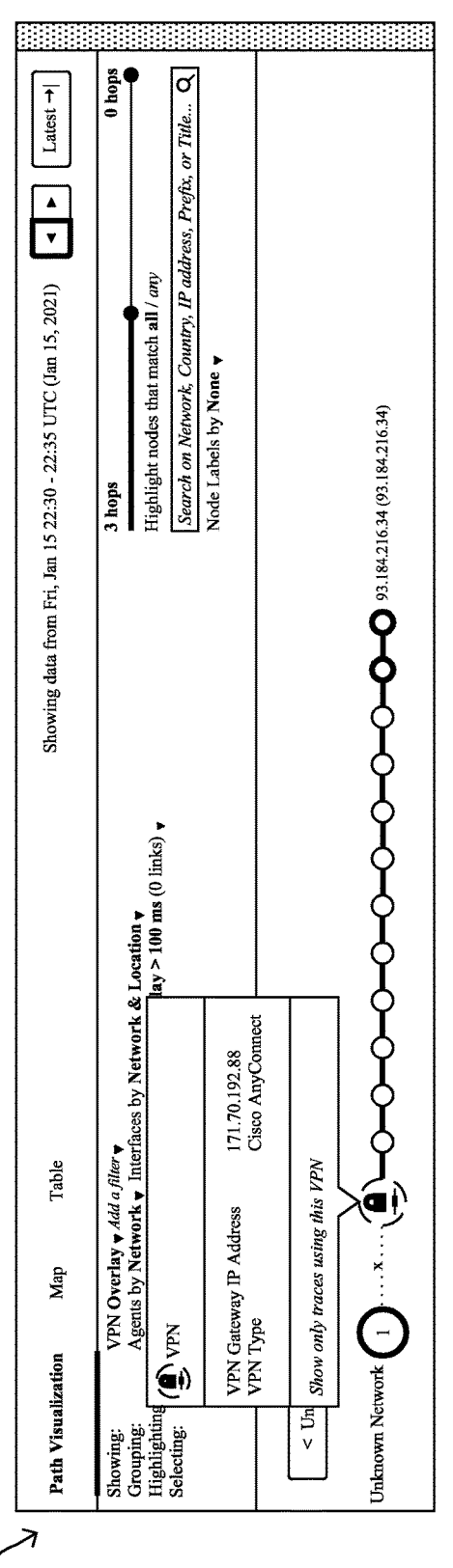

Operationally, FIG. 4 illustrates an example of an architecture 400 of a synthetic probing system for intelligent network path probing, according to various embodiments. At the core of architecture 400 is path visibility process 248, which may be executed by one or more devices that participate in network path probing, network path data and/or performance metric collection, network routing, a network supervisory service, a network infrastructure monitoring/mapping service, an application delivery troubleshooting service, etc. In various embodiments, path visibility process 248 may include instructions executable as part of or in collaboration with a network monitoring SaaS platform which may configure synthetic network path probe protocols and/or configurations, cause a path probing service in the network comprising one or more probing agent 406 (406-1 . . . 406-N) to generate and/or send those synthetic probes, and/or collect and analyze the data returned by those synthetic probes.

As shown, path visibility process 248 may include probe manager 402 and rescan manager 404. As would be appreciated, the functionalities of these components may be combined or omitted, as desired. In addition, these components may be implemented on a singular device or in a distributed manner, in which case the combination of executing device can be viewed as their own singular device for the purposes of executing path visibility process 248.

During execution of path visibility process 248, probe manager 402 may intelligently select one or more synthetic probe protocols and/or configurations to be used for each probing agent 406 to probe a network path between a particular source-destination pair. Each probing agent 406 may be assigned its own synthetic probe protocol and/or configuration to execute. This may mean that, in some instances, different probing agents receive different probe protocol and/or configuration assignments from one another.

The synthetic probe protocol and/or configuration selected by probing agent 406 for each probing agent 406 may be used to perform a pre-probe scan of the network path between the particular source and destination. The pre-probe scan may be performed run prior to configuring and/or running a continuous or long duration set of synthetic monitoring probes. The pre-probe scan may be a network probing characterization method that uses experimental probing and/or intelligent predictions (e.g., based on historical data, machine learning techniques, etc.) to determine a set of potential probing algorithms that should be used for a given path between a source and a destination for longer duration monitoring of the path.

In various embodiments, the continuous or longer duration set of synthetic monitoring probes may ultimately be selected based on the results of the pre-probe scan. For example, one or more of the synthetic probe protocols and/or configurations from those selected that are observed or predicted to produce (e.g., alone or in combination) a most complete and accurate hop-by-hop view of the path between a source and a destination in the pre-probe scan may be used in the continuous or longer duration set of synthetic monitoring probes. Meanwhile, the other non-contributing protocols and/or configurations (e.g., those that did not provide as high-quality visibility, those with more routers failing to responded, those that did not contribute additional insight able to be combined into a collective path trace, etc.) that may be available and/or may have been used in the pre-probe scan may not be used.

In various embodiments, probe manager 402 may leverage multiple network path probing protocols and configurations for a single source/destination pair. That is, in contrast to a traditional probing scheme that may use a single probe configuration that approximates application traffic, probe manager 402 may determine a multi-probe mechanism that intelligently employs diverse probing strategies to collectively generate a consistent and complete network path representation. This may mean employing more than one type of synthetic probe protocol and/or configuration in the pre-probe scan and/or intelligently combing the returned probe data from the scans with the diverse probes in order to minimize the number of non-responding nodes, provide the most accurate path representation, and/or reduce the impact of processing delays.

Probe manager 402 may select a synthetic probe protocol and/or configuration to be used by each probing agent 406 to synthetically probe the path between the source and the destination from among probing options available to the synthetic probing system. The probing options may include different types of packets that can be used by available probing agents to perform path probing between the source and the destination. Some examples may include TCP packets, ICMP packets, UDP packets, IGRP packets, other types of packets, etc. In addition, the probing options may include various configurations that may be applied to those packets under different options (e.g., DSCP markings, etc.). Probe manager 402 may select a portion of and/or all of the synthetic probe protocols and/or configurations available to the synthetic probing system for use by the agents in order to generate multiple diverse perspectives that can be collectively used generate a complete view of the network path.

Probe manager 402 may select all of the synthetic probe protocols and/or configurations that will be used by each probing agent 406 prior to initiating the initial probing scan. Alternatively, the probe manager 402 may select the synthetic probe protocols and/or configurations to be used based off of prior synthetic probe protocols and/or configurations. For example, probe manager 402 may decide whether to not to select a subsequent synthetic probe protocol and/or configuration to be used based on knowledge or of probing results learned from the historic path trace results from probing with a prior synthetic probe protocol and/or configuration. For instance, when the path trace from the prior synthetic probe protocol and/or configuration met or crossed a probe quality threshold (e.g., an amount of non-responding nodes, etc.) suggesting that the prior probe yielded an incomplete representation of the path, then probe manager 402 may not be selected to participate in a pre-probe scan.

In various embodiments, probe manager 402 may select the synthetic probe protocols and/or configurations that will be used by each probing agent 406 based on characteristics of an application for which the path is being measured. For instance, probe manager 402 may select one or more probe protocol and/or configuration to be used by the probing agents based on a communication protocol and/or a corresponding connection type used by an application for which the path is being probed. Say that a web application is observed or identified as using HTTP and hence TCP connections for its communication. Then probe manager 402 may select TCP synthetic packets to be used for the probe instead of and/or in addition to ICMP packets.

Additionally, probe manager 402 may select the synthetic probe protocols and/or configurations that will be used by each probing agent 406 based on network characteristics. For instance, different network operators and/or ISPs/Clouds have different motivations and policies for blocking and/or allowing different traffic. As such, probe manager 402 may select the synthetic probe protocols and/or configurations that will be used by each probing agent 406 to comport with and/or leverage the known policies and/or motivations of the specific network operators and/or ISPs/Clouds involved. Further, even the same operator may have different policies in different regions. As such, probe manager 402 may select the synthetic probe protocols and/or configurations that will be used by each probing agent 406 to comport with and/or leverage the regional policies of the specific regions where the probing takes place (e.g., regions where application resides, regions where probing agents reside, regions where destination resides, network path traversal regions, etc.).

Probe manager 402 may also select the synthetic probe protocols and/or configurations that will be used by each probing agent 406 separately. It should be appreciated that, by doing so, probe manager 402 may be selecting the best (e.g., e.g., deliver a most complete and/or complementary to other probes characterization or hop-by-hop view of the network path) synthetic probe protocol and/or configuration on a probing agent-by-probing agent basis. Different probing agents may be resident in different network regions, subject to different network characteristics and conditions, etc. that influence which synthetic probe protocol and/or configuration will be best (e.g., most insightful, most complementary to tother probes, etc.) for them to use when probing. For example, different portions of the network where particular probing agents are located may respond better (e.g., generate more accurate, complete, and/or complementary path trace data, etc.) to particular synthetic probe protocols and/or configurations than others. Therefore, different probing agents may receive different synthetic probe protocol and/or configuration assignments based on their individual network circumstances and/or configurations.

For example, since probing agents generate probes from different locations to the same target destination, they may need to use different probing approaches to yield the best network path view. For instance, GeoDNS or Anycast IP routing may result in the same target resolving to different target webservers and networks when subject to different polices that impact path tracing. Probe manager 402 may consider these factors in selecting synthetic probe protocols and/or configurations that will be used by a particular probing agent so that it reliably resolves to the intended target.

Probe manager 402 may use historical data from synthetic probing and/or insights derived therefrom to select the synthetic probe protocols and/or configurations that will be used by each probing agent 406. For example, probe manager 402 may, from historical path traces by variously configured probes, predict (e.g., using machine learning techniques, statistical analysis, trend identification, etc.) and/or recommend future synthetic probe protocols and/or configurations to be used for path tracing of applications with similar application characteristics, with similar network characteristics, etc. That is, probe manager 402 may learn which synthetic probe protocols and/or configurations yield the best results (e.g., the most complete and/or complementary network path view, etc.) in which conditions and for which applications in order to predict their performance for future similar applications, network conditions, etc. Initially the probe manager 402 may conduct more extensive synthetic probing, employing a wider variety of synthetic probe protocols and/or configurations in order to learn which protocols and/or configurations work best (e.g., deliver a most complete characterization or hop-by-hop view of the network path) to probe which applications, network conditions and policies, etc. Once probe manager 402 has learned these relationships, this intelligence can be used to make informed predictions as to which protocols and/or configurations to use in various probing situations without the need to exhaustively iterate through a wide array of available protocols and/or configurations every time.

Once the probe manager 402 has selected the set of synthetic probe protocols and/or configurations that will be used by the probing agent, it will then send each probing agent its respective synthetic probe protocol and/or configuration assignment to perform the initial pre-probe scan. Probe manager 402 may receive the results (e.g., path trace data, etc.) of the probing by each of the probing agents. The probe manager 402 may intelligently combine the probe data from each of the probing agents so that the data from some of the probes can supplement missing data from other probes and the combination minimizes the number of non-responding nodes, provides the most complete and accurate path representation for the path between the source and destination, and/or minimizes the impact of processing delays is reduced.

During execution of path visibility process 248, rescan manager 404 may monitor network conditions and trigger a probe rescan based on changes in those conditions. A probe rescan may be an additional probing scan conducted subsequent to the initial pre-probe scan and/or subsequent to the establishment of the continuous and/or longer duration probing operations based on the initial pre-probe scan. For example, the probe rescan may be triggered in response to detecting a deterioration in the ability of the existing probes to provide complete and accurate network insights for a path. The probe rescan may involve testing probes that are not currently being used to monitor the path in order to determine whether they improve and/or ameliorate the detected deterioration either by replacing or augmenting the activity of the probes currently being used for monitoring.

Rescan manager 404 may utilize intelligent automation to detect changes in the network that warrant performing a rescan of probing methods. Detecting the changes in the network may be accomplished by analyzing network and/or application metrics collected from the probes monitoring the network path. For example, the network changes may be detected by comparing the collected network metrics to threshold levels, analyzing the network metrics for trends, detecting changes from prior network metrics, etc. Any comparison threshold used to detect changes and/or its significance may be learned (e.g., using ML techniques, etc.) based on historical probing data and/or path trace results. Rescan manager 404 may analyze the detected changes to determine if they will impact and/or degrade path visibility.

For example, if a particular synthetic network probe has been running from source A to destination B and consistently measuring ten network hops, then suddenly changes to five network hops, rescan manager 404 may detect this change. Rescan manager 404 may determine (e.g., based on comparison with a learned threshold, based on comparison with a default threshold, etc.) that this change signifies a configuration change in the network and/or is of significant enough magnitude to warrant a path rescan to determine if there is a new combination of alternate probing methods that could be used to improve network path visibility for that path going forward.

In various embodiments, when rescan manager 404 determines that the detected change warrants a path rescan, it may predict which alternate synthetic probe protocol and/or configuration may improve the network path visibility based on historical data and/or any available data about the current network and/or application conditions. Rescan manager 404 may trigger the rescan, sending an alternate synthetic probe protocol and/or configuration to one or more of the probing agents. The probing agents may perform the probe rescan by probing the network path with their assigned alternate synthetic probe protocols and/or configurations. The results of the rescan may be combined and/or analyzed to determine a revised probing strategy going forward for the path being monitored. The results may also be used to augment learning that informs the predictions of probe manager 402 for future pre-scan probes of other paths.

FIGS. 5A-5D illustrate examples of path traces associated with intelligent network path probing, according to various embodiments. As previously noted, the synthetic probing system described herein may leverage multiple network path probing protocols and/or configurations for a single source destination pair and then intelligently combine the probe data to minimize the number of non-responding nodes, provide a most accurate path representation, and reduce the impact of processing delays. This synthetic probing system may have many options available to it in terms of what types of packets it can use when performing this type of path probing and various configuration options for those packets. The synthetic probing system may select combinations of synthetic probing strategies, deployed across probing agents, from among the options in order to synergistically build a more complete mapping of the path for a source destination pair than is possible with a single synthetic probing protocol and/or configuration alone.

For example, the synthetic probing system may be utilized to measure the path performance of a web application hosted by a cloud provider from some source A. The synthetic probing systems may probe the path from source A to a destination B (e.g., www.example.com) using ICMP packets for path discovery. The synthetic probing system may cause probing agents to probe the path with ICMP packets. The result of this probing may be ICMP path trace 502. ICMP path trace 502 may reveal twelve hops with three non-responding nodes 510. The three non-responding nodes 510 may correspond to instances when the synthetic probe did not receive a TTL Expired response.

The ICMP path trace 502 provides a useful but incomplete view of the network path on its own. The synthetic probing system may determine that the web application being tested will use HTTP and hence TCP connections and likely not ICMP connections. As such, the synthetic probing system may determine that the ICMP path trace 502 may not accurately and/or fully represent the actual path that will be taken by the application's traffic.

Therefore, the synthetic probing system may determine that probing with a TCP synthetic packet instead of and/or in addition to ICMP packets may potentially yield and/or contribute to a more accurate representation of the network path than the ICMP packet probes alone. Consequently, the synthetic probing system may select TCP synthetic packet instead of and/or in addition to ICMP packets to be used by the packet agents for path discovery from the same source A to destination B. The synthetic probing system may assign the TCP packet probing configuration to one or more of the packet agents to perform probing with the TCP packets. The probing by the corresponding probing agent(s) may yield the TCP path trace 504.

TCP path trace 504 resulting from the TCP based probing may reveal one or more alternate path 512 between source A and destination B. The alternate path 512 was not visible in the ICMP path trace 502 from the ICMP based probes. Therefore, the TCP path trace 504 has improved the synthetic probing systems knowledge of the path thereby providing additional data that can be utilized to construct a more accurate mapping of the path. However, while the TCP based probing improved knowledge of the path in one aspect, it has degraded it elsewhere. Specifically, TCP path trace 504 has two additional non-responding routers as compared to the ICMP path trace 502 as evidenced by the five non-responding nodes 514 of TCP path trace 504 versus the three non-responding nodes 510 of ICMP path trace 502.

However, by implementing this multi-probe approach, synthetic probing system may combine the information returned from deploying this diverse set of probes, each providing their unique perspective of the network path, to develop a complete picture of the network path being probed. In the context of the above example, the synthetic probing system can combine the best of both traces to construct a more complete mapping of the network path that includes both the improved knowledge of participating hops provided by the fewer number of non-responding nodes from the ICMP path trace 502 and the improved knowledge of the alternate path 512 from the TCP path trace 504. Ultimately, the mapping of the network path and/or the knowledge of the probes involved in its production may be used to set up a continuous and/or longer duration probing scheme to monitor the path performance. In addition, knowledge of the results of each of the path traces may be used to learn (e.g., train a model, form associations, perform statistical analysis, etc.) which synthetic probe protocols and/or configurations alone and/or in combination produce the most complete mappings. This knowledge may then be used to predict which synthetic probe protocols and/or configurations alone and/or in combination should be selected for future pre-probe scans.

In some examples, the synthetic probing system may be utilized in path measurements where VPNs are involved. As can be appreciated by the first VPN path trace 506 and the second VPN path trace 508 of the same source to destination network path, the multi-probe approach may be used with VPN paths where the different probes individually reveal different aspects of a network path in a similar manner as to what was described with respect to non-VPN containing paths above. The different aspects of the network path may then be combined to reveal a more complete assessment of the network path involving the VPN.

Figure 6:
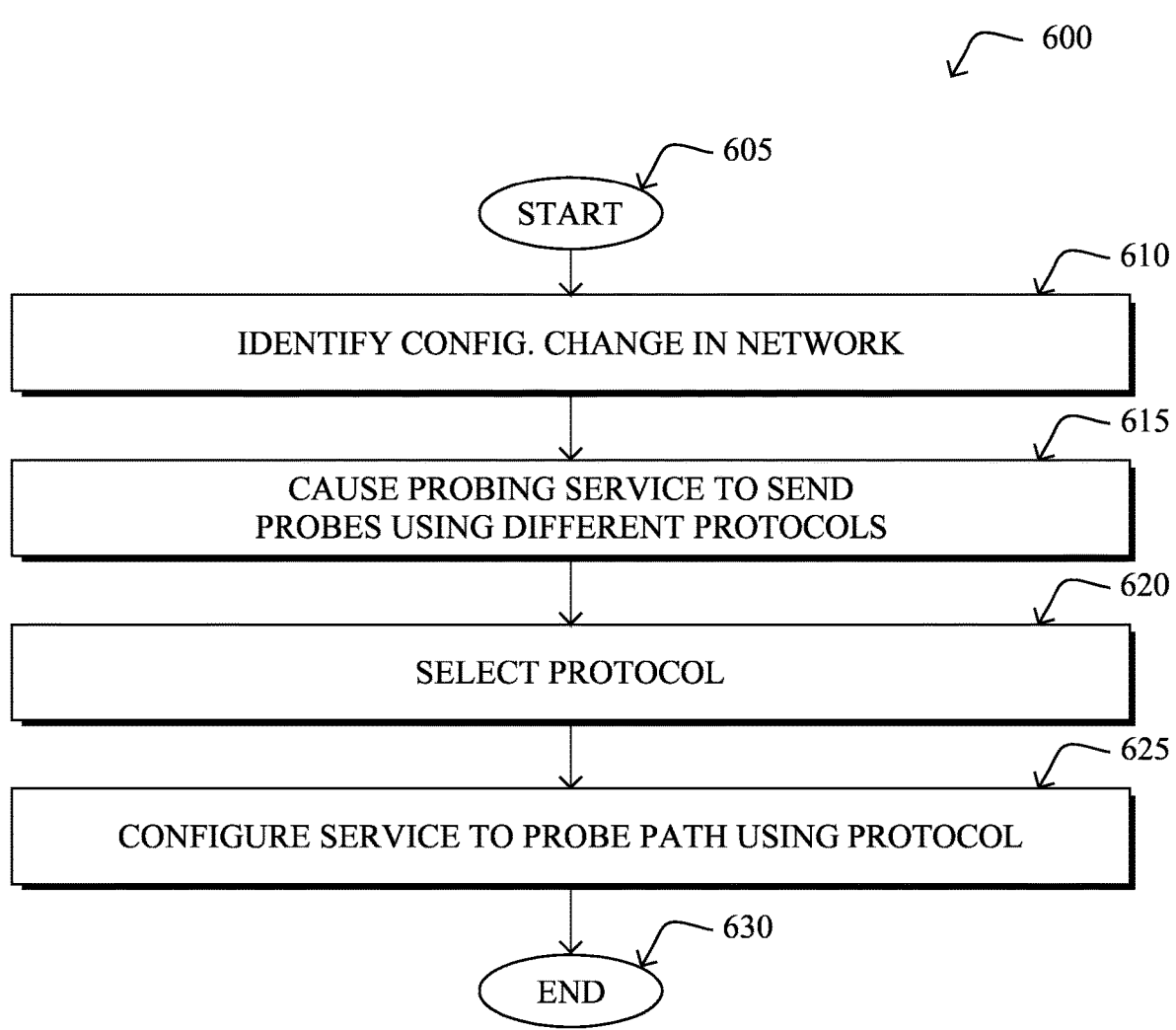
FIG. 6 illustrates an example simplified procedure for intelligent network path probing in a network, in accordance with one or more embodiments described herein.

FIG. 6 illustrates an example simplified procedure for intelligent network path probing in a network in accordance with one or more embodiments described herein. For example, a non-generic, specifically configured device (e.g., device 200) may perform procedure 600 by executing stored instructions (e.g., path visibility process 248). The procedure 600 may start at step 605, and continues to step 610, where, as described in greater detail above, the device may identify a configuration change in a network based on path probing data obtained by a path probing service from the network. In various embodiments, the device may do so by determining, based on the path probing data, that a number of hops measured along the path by the path probing service has decreased over time. In one embodiment, the configuration change is made to the path.

At step 615, as detailed above, the device may cause, based on the configuration change, the path probing service to obtain updated path probing data from the network by sending synthetic probes along a path in the network using a plurality of different protocols. In some embodiments, the synthetic probes include Transmission Control Protocol (TCP) and Internet Control Message Protocol (ICMP) probes. In further embodiments, the synthetic probes use a plurality of different Differentiated Services Code Point (DSCP) options. In one embodiment, the device causes the path probing service to send the synthetic probes towards a target networking entity or target webserver. In another embodiment, the device causes the path probing service to use different combinations of the plurality of different protocols for the synthetic probes in different geographic regions.

At step 620, the device may select, based on the updated path probing data, a particular protocol from among the plurality of different protocols to use to probe the path, as described in greater detail above. In various embodiments, the device selects the particular protocol based in part on a number of hops discovered by the synthetic probes sent by the path probing service.

At step 625, as detailed above, the device may configure the path probing service to probe the path using the particular protocol. In some embodiments, the device may configure the path probing service to conduct its probing using a subset of the plurality of protocols, including that of the particular protocol. In some embodiments, the path may be associated with an online application accessible via the path.

Procedure 600 then ends at step 625.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, will greatly enhance the operation of communication networks, such as the Internet, by introducing mechanisms for intelligent network probing. This synthetic probing system may start with a comprehensive network probing characterization, including pre-probe scans, to identify the most suitable probing algorithms for a given path between a source and destination. By adopting a multi-probe approach, the synthetic probing system intelligently combines the information gathered from a diverse set of probes. Each probe offers a unique perspective of the network path, enabling the system to construct a complete and accurate picture of the probed network path. This approach conserves computational and communication resources by eliminating the need for excessive probing attempts, eliminating reliance on incorrect or incomplete understandings of network paths, and significantly reducing the number of required probes to achieve a complete understanding of these paths.

Moreover, these intelligent network probing mechanisms leverage the knowledge gained from the characterizations to improve future probing methods. The system can recommend more accurate probing techniques based on various network characteristics, ensuring higher precision in subsequent probing attempts. Additionally, the system intelligently detects changes in network policies that may impact path visibility, promptly triggering another probing scan to maintain up-to-date information thereby maintaining the accuracy of probing and monitoring efforts.

These advancements in intelligent network probing empower organizations to dynamically and reliably obtain highly accurate visibility of the network paths traversed by their critical application traffic. Even amidst changing network conditions, these techniques ensure that organizations have a comprehensive understanding of their network infrastructure, enabling them to optimize their operations, conserve resources, and enhance overall network performance.

While there have been shown and described illustrative embodiments that provide for intelligent network path probing, it is to be understood that various other adaptations and modifications may be made within the spirit and scope of the embodiments herein. For example, while certain embodiments are described herein with respect to using certain types of probe protocols and configurations in pre-probe scan and rescan operations, the probes and their usage is not limited as such and may include other protocols and configurations that can be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

obtaining, by a device, historical path probing data for a network over time from a path probing service that sends synthetic probes using a plurality of different protocols along one or more network paths used by traffic of at least one application in a network, wherein the synthetic probes ose traffic characteristics of the traffic of the at least one application;

identifying, by the device, a configuration change in the network based on updated path probing data obtained by the path probing service from the network;

predicting, by the device in response to the configuration change, one or more of the plurality of different protocols and configurations of the one or more of the plurality of different protocols that would alone or in combination produce a most complete and accurate hop-by-hop view of the one or more network paths based at least in part on the historical path probing data;

selecting, by the device and based on the predicting, one or more particular protocols from among the plurality of different protocols and configurations of the one or more particular protocols to use to probe a particular path for the at least one application for continued probing based on predicting that the one or more particular protocols alone or in combination produce a most complete and accurate hop-by-hop view of the particular path from among the plurality of different protocols; and configuring, by the device, the path probing service to probe the particular path using the one or more particular protocols and the traffic characteristics of the traffic of the at least one application for continued probing responsive to the configuration change in the network.

2. The method of claim 1, wherein the synthetic probes include Transmission Control Protocol (TCP) and Internet Control Message Protocol (ICMP) probes.

3. The method of claim 1, wherein the synthetic probes use a plurality of different Differentiated Services Code Point (DSCP) options.

4. The method of claim 1, wherein the path probing service sends the synthetic probes towards a target networking entity or target webserver.

5. The method of claim 1, wherein identifying the configuration change in the network comprises:

determining that a number of hops measured along the particular path by the path probing service has decreased over time.

6. The method of claim 1, wherein the path probing service uses different combinations of the plurality of different protocols for the synthetic probes in different geographic regions.

7. The method of claim 1, wherein the particular path comprises a network tunnel.

8. The method of claim 1, wherein the configuration change is made to the particular path.

9. The method of claim 1, wherein the particular path is associated with an online application accessible via the particular path.

10. An apparatus, comprising:

one or more network interfaces;

a processor coupled to the one or more network interfaces and configured to execute one or more processes; and a memory configured to store a process that is executable by the processor, the process when executed configured to:

obtain historical path probing data for a network over time from a path probing service that sends synthetic probes using a plurality of different protocols along one or more network paths used by traffic of at least one application in a network, wherein the synthetic probes use traffic characteristics of the traffic of the at least one application:

identify a configuration change in the network based on updated path probing data obtained by the path probing service from the network;

predict, in response to the configuration change, one or more of the plurality of different protocols and configurations of the one or more of the plurality of different protocols that would alone or in combination produce a most complete and accurate hop-by-hop view of the one or more network paths based at least in part on the historical path probing data;

select, based on the predicting, a one or more particular protocols from among the plurality of different protocols and configurations of the one or more particular protocols to use to probe a particular path for the at least one application for continued probing based on predicting that the one or more particular protocols alone or in combination produce a most complete and accurate hop-by-hop view of the particular path from among the plurality of different protocols; and configure the path probing service to probe the particular path using the one or more particular protocols and the traffic characteristics of the traffic of the at least one application for continued probing responsive to the configuration change in the network.

11. The apparatus of claim 10, wherein the synthetic probes include Transmission Control Protocol (TCP) and Internet Control Message Protocol (ICMP) probes.

12. The apparatus of claim 10, wherein the synthetic probes use a plurality of different Differentiated Services Code Point (DSCP) options.

13. The apparatus of claim 10, wherein the path probing service sends the synthetic probes towards a target networking entity or target webserver.

14. The apparatus of claim 10, wherein the apparatus identifies the configuration change in the network by:

determining that a number of hops measured along the particular path by the path probing service has decreased over time.

15. The apparatus of claim 10, wherein the path probing service uses different combinations of the plurality of different protocols for the synthetic probes in different geographic regions.

16. The apparatus of claim 10, wherein the particular path comprises a network tunnel.

17. The apparatus of claim 10, wherein the configuration change is made to the particular path.

18. A tangible, non-transitory, computer-readable medium storing program instructions that cause a device to execute a process comprising:

obtaining, by the device, historical path probing data for a network over time from a path probing service that sends synthetic probes using a plurality of different protocols along one or more network paths used by traffic of at least one application in a network, wherein the synthetic probes use traffic characteristics of the traffic of the at least one application;

identifying, by the device, a configuration change in the network based on updated path probing data obtained by the path probing service from the network;

predicting, by the device in response to the configuration change, one or more of the plurality of different protocols and configurations of the one or more of the plurality of different protocols that would alone or in combination produce a most complete and accurate hop-by-hop view of the one or more network paths based at least in part on the historical path probing data;

selecting, by the device and based on the predicting, a one or more particular protocols from among the plurality of different protocols and configurations of the one or more particular protocols to use to probe a particular path for the at least one application for continued probing based on predicting that the one or more particular protocols alone or in combination produce a most complete and accurate hop-by-hop view of the particular path from among the plurality of different protocols; and configuring, by the device, the path probing service to probe the particular path using the one or more particular protocols and the traffic characteristics of the traffic of the at least one application for continued probing responsive to the configuration change in the network.

\*   \*   \*   \*   \*   10